United States Patent
Yamamoto

(10) Patent No.: US 8,704,906 B2
(45) Date of Patent: Apr. 22, 2014

(54) MOBILE PHONE TERMINAL WITH CAMERA FUNCTION AND CONTROL METHOD THEREOF FOR FAST IMAGE CAPTURING

(75) Inventor: Takashi Yamamoto, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 366 days.

(21) Appl. No.: 12/629,384

(22) Filed: Dec. 2, 2009

(65) Prior Publication Data

US 2010/0151903 A1 Jun. 17, 2010

(30) Foreign Application Priority Data

Dec. 17, 2008 (JP) ................. 2008-321608

(51) Int. Cl.
*H04N 5/235* (2006.01)
*G03B 7/00* (2006.01)
*H04N 5/238* (2006.01)
*H04H 40/00* (2008.01)

(52) U.S. Cl.
USPC .......... 348/221.1; 348/229.1; 348/362; 348/366; 455/3.06

(58) Field of Classification Search
USPC ............ 348/227.1, 221.1, 238, 333.13, 348/362–369, 370, 371
See application file for complete search history.

(56) References Cited

U.S. PATENT DOCUMENTS

| | | | |
|---|---|---|---|
| 5,745,808 A * | 4/1998 | Tintera | 396/236 |
| 6,687,515 B1 * | 2/2004 | Kosaka | 455/566 |
| 6,832,729 B1 | 12/2004 | Perry et al. | |
| 7,701,497 B2 * | 4/2010 | Fraenkel et al. | 348/294 |
| 7,783,191 B2 * | 8/2010 | Furumochi | 396/263 |
| 7,852,519 B2 * | 12/2010 | Meier et al. | 358/474 |
| 8,089,552 B2 * | 1/2012 | Suzuki | 348/333.13 |
| 2001/0036231 A1 | 11/2001 | Easwar et al. | |

(Continued)

FOREIGN PATENT DOCUMENTS

| JP | 2005-110157 A | 4/2005 |
|---|---|---|
| JP | 2005-192096 | 7/2005 |

(Continued)

OTHER PUBLICATIONS

European Search Report issued Jul. 20, 2011, in Patent Application No. 09177017.2.

(Continued)

*Primary Examiner* — Chia-Wei A Chen
(74) *Attorney, Agent, or Firm* — Oblon, Spivak, McClelland, Maier & Neustadt, L.L.P.

(57) ABSTRACT

A mobile phone terminal with a camera function includes a camera hardware section having an image sensor and a camera lens, an instruction input section for inputting an instruction to start image capturing, an illumination sensor which is arranged on an outer surface of a housing and detects an ambient illumination value while a mobile phone function is activated, and an image capturing start control section. The image capturing start control section sets camera driver software into a standby state after starting it while the mobile phone function is activated. When an instruction to start image capturing is inputted from the instruction input section, the image capturing start control section determines an exposure value used for image capturing by using the detected illumination value, restores the camera driver software, and causes the camera hardware section to perform image capturing using the exposure value.

6 Claims, 8 Drawing Sheets

(56) References Cited

U.S. PATENT DOCUMENTS

| | | | |
|---|---|---|---|
| 2002/0054232 A1* | 5/2002 | Inagaki | 348/372 |
| 2002/0196357 A1* | 12/2002 | Battles et al. | 348/333.01 |
| 2003/0035101 A1* | 2/2003 | Yuasa | 356/213 |
| 2003/0048714 A1* | 3/2003 | Conti | 369/53.1 |
| 2003/0063208 A1* | 4/2003 | Kazami | 348/333.13 |
| 2004/0027474 A1* | 2/2004 | Aoyama et al. | 348/335 |
| 2004/0036781 A1* | 2/2004 | Enomoto | 348/231.99 |
| 2004/0102225 A1* | 5/2004 | Furuta et al. | 455/566 |
| 2004/0218738 A1* | 11/2004 | Arai et al. | 379/93.17 |
| 2005/0002666 A1* | 1/2005 | Asai et al. | 396/429 |
| 2005/0052171 A1* | 3/2005 | Horimoto | 323/282 |
| 2005/0146621 A1* | 7/2005 | Tanaka et al. | 348/211.2 |
| 2005/0206750 A1 | 9/2005 | Aoyagi et al. | |
| 2006/0001748 A1* | 1/2006 | Kamon et al. | 348/234 |
| 2006/0033809 A1* | 2/2006 | Farley | 348/14.01 |
| 2006/0044459 A1* | 3/2006 | Kato | 348/362 |
| 2006/0055808 A1* | 3/2006 | Maeng et al. | 348/333.11 |
| 2006/0105806 A1* | 5/2006 | Vance et al. | 455/556.1 |
| 2006/0274155 A1* | 12/2006 | Kim et al. | 348/208.3 |
| 2007/0047803 A1* | 3/2007 | Nikkanen | 382/162 |
| 2007/0052832 A1* | 3/2007 | Bae et al. | 348/333.12 |
| 2007/0166020 A1* | 7/2007 | Quan et al. | 396/52 |
| 2007/0200917 A1* | 8/2007 | Chen et al. | 348/14.01 |
| 2007/0237506 A1* | 10/2007 | Minema et al. | 396/52 |
| 2007/0248330 A1* | 10/2007 | Pillman et al. | 386/107 |
| 2007/0298839 A1* | 12/2007 | Aoyama et al. | 455/556.1 |
| 2008/0036868 A1* | 2/2008 | Furumochi | 348/221.1 |
| 2008/0070647 A1* | 3/2008 | Hamamura et al. | 455/575.3 |
| 2008/0136940 A1* | 6/2008 | Srikanth et al. | 348/231.99 |
| 2008/0175582 A1* | 7/2008 | Furumochi | 396/263 |
| 2008/0212753 A1* | 9/2008 | Yoshizawa | 379/110.01 |
| 2008/0239093 A1 | 10/2008 | Easwar et al. | |
| 2008/0260373 A1* | 10/2008 | Bell et al. | 396/213 |
| 2008/0303922 A1* | 12/2008 | Chaudhri et al. | 348/231.99 |
| 2009/0027188 A1* | 1/2009 | Saban | 340/521 |
| 2009/0296906 A1* | 12/2009 | Kuroda et al. | 379/201.01 |
| 2011/0128403 A1 | 6/2011 | Easwar et al. | |
| 2011/0242402 A1* | 10/2011 | Wernersson | 348/348 |

FOREIGN PATENT DOCUMENTS

| | | |
|---|---|---|
| JP | 2005-252800 | 9/2005 |
| JP | 2007-282265 | 10/2007 |
| JP | 2008-42248 A | 2/2008 |

OTHER PUBLICATIONS

Chinese Office Action issued Feb. 13, 2012, in Patent Application No. 200910253792.2.

Office Action issued Sep. 27, 2012 in Chinese Patent Application No. 200910253792.2.

* cited by examiner

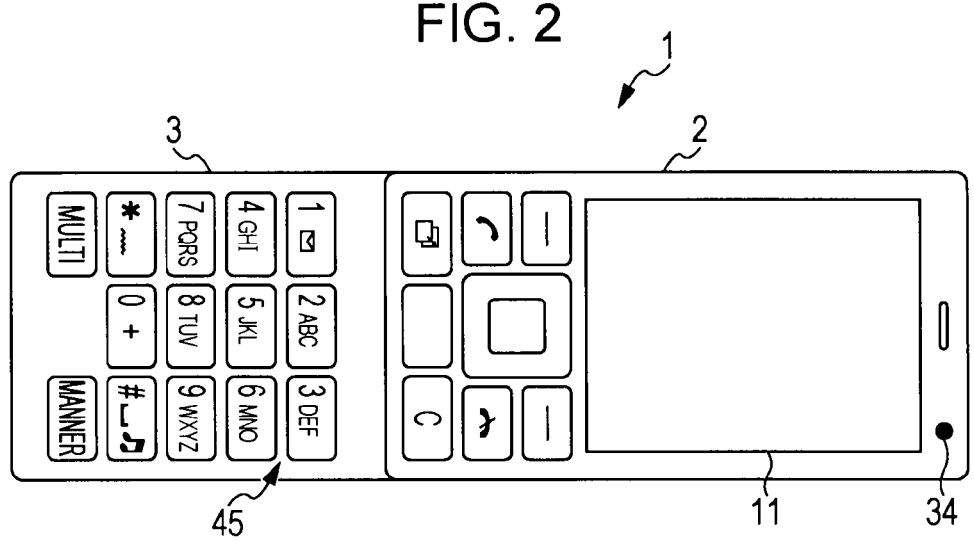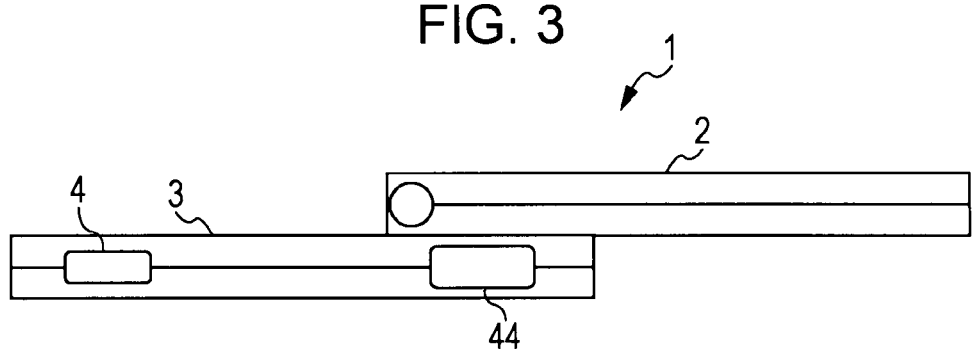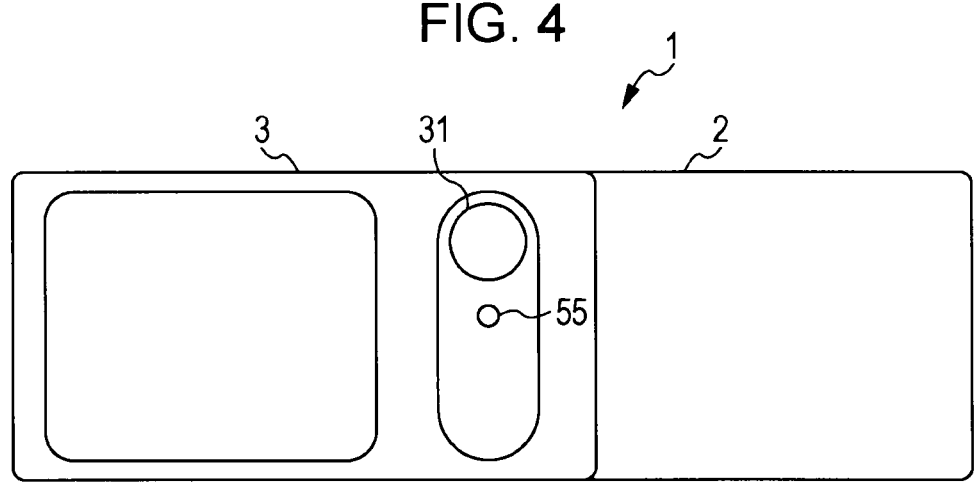

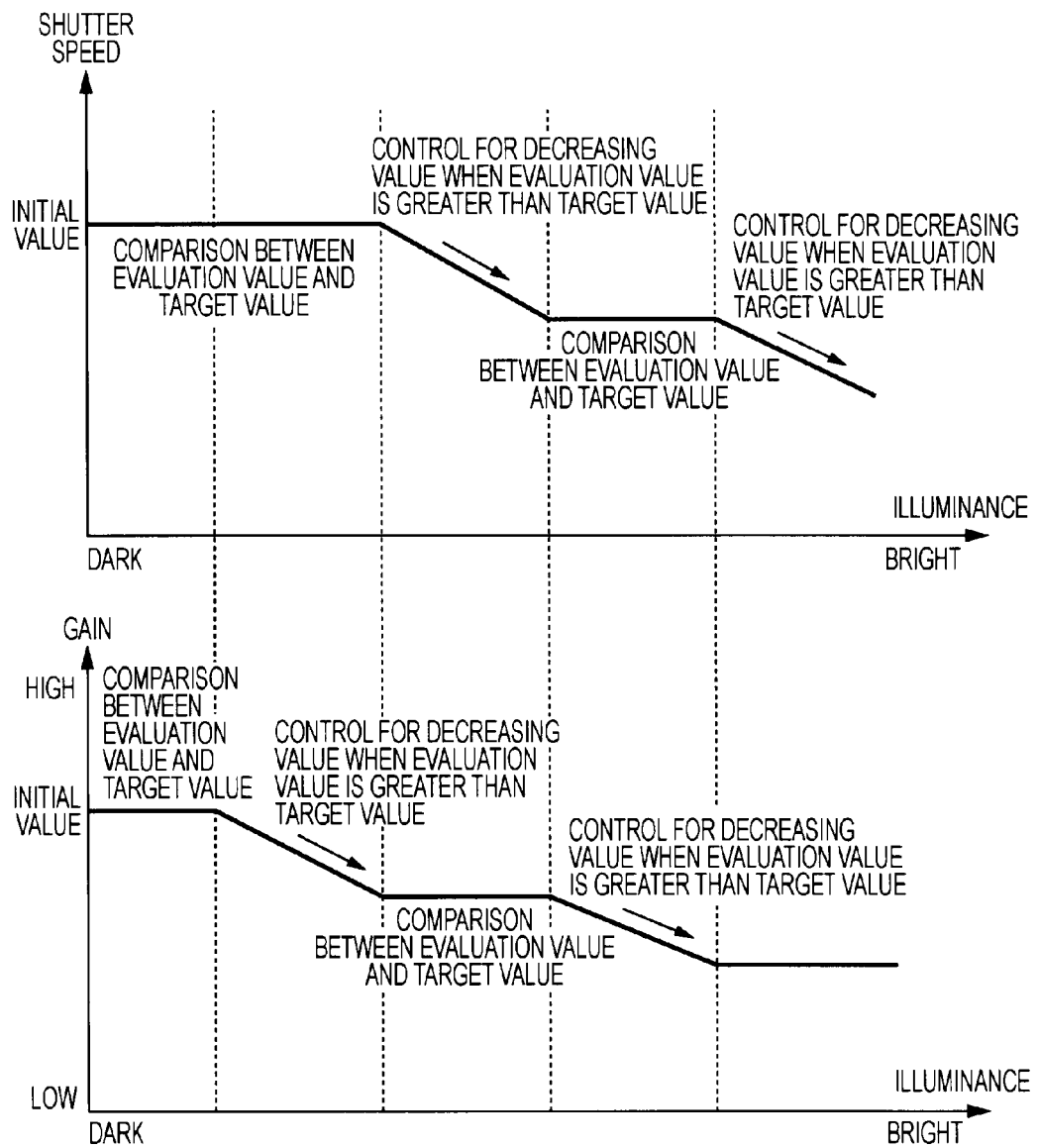

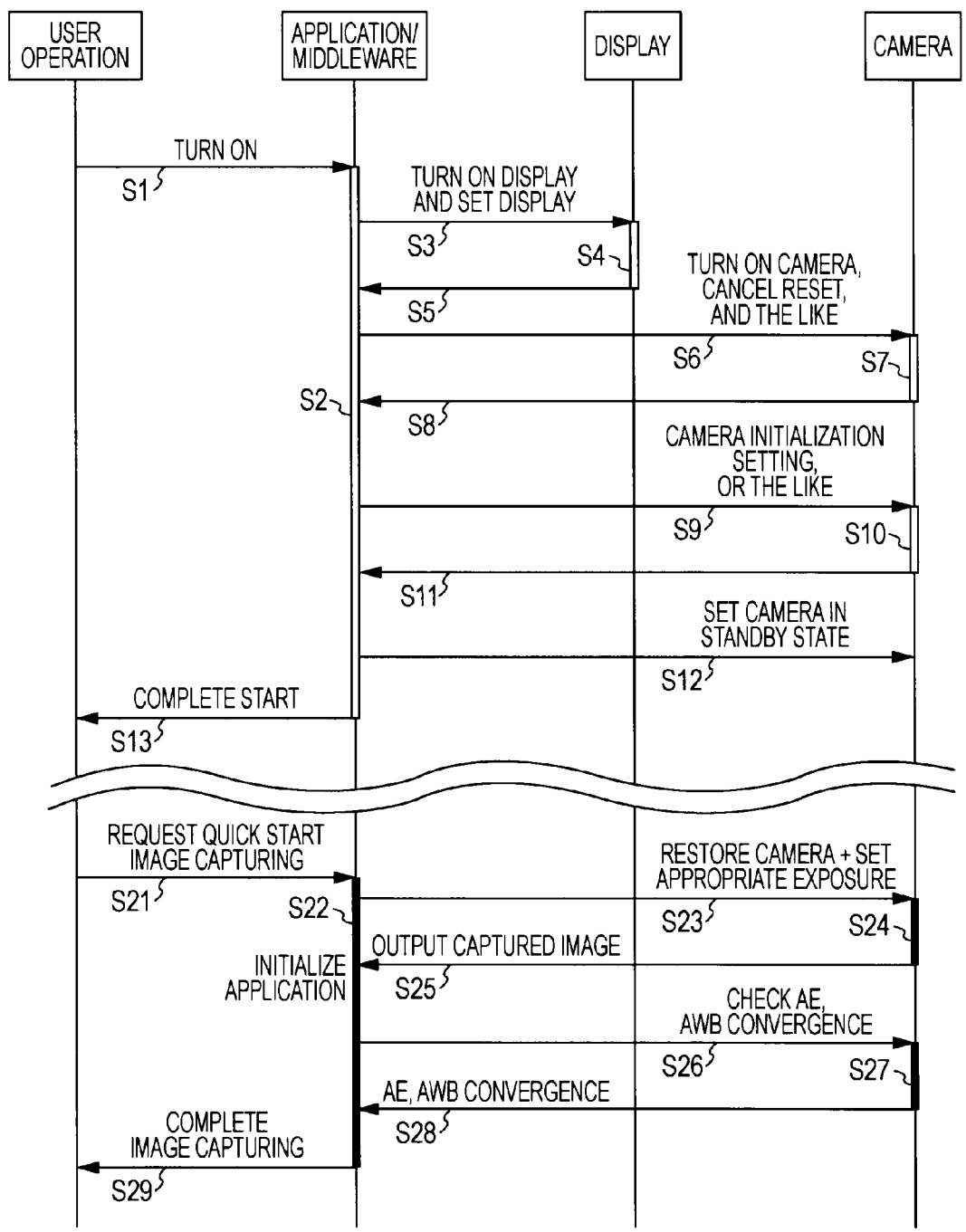

MOBILE PHONE TERMINAL WITH CAMERA FUNCTION AND CONTROL METHOD THEREOF FOR FAST IMAGE CAPTURING

BACKGROUND OF THE INVENTION

1. Field of the Invention

The present invention relates to a mobile phone terminal with a camera function and a control method thereof.

2. Description of the Related Art

Digital cameras, which are now mainstream camera apparatuses, are becoming smaller, lighter, and thinner than film cameras in the related art, and the number of images which can be captured is very large compared with film cameras in the related art. Therefore, it is becoming popular for users to carry a digital camera at all times or wear it about their person, and capture images of various subjects without considering the number of captured images.

However, as a negative aspect generated from the digitalization of camera apparatus, there is a problem that a starting time from power on to when an image can be actually captured is significantly long compared with film cameras in the related art. Specifically, although, for example, a use of a film-with-lens camera (so-called disposable camera), which was popular before digital cameras became mainstream, can get an instantaneous shutter chance by just pressing a shutter button without a power-on operation or the like, a user of a digital camera has to perform at least three steps of: operating a power-on switch; waiting for the camera to start and checking that the camera has started; and operating a shutter button when capturing an image. Therefore, for example, when trying to capture an instantaneous image by using a digital camera apparatus, a case often occurs in which the camera apparatus does not start in time and the shutter chance is missed.

Therefore, techniques described in FIG. 1 of Japanese Unexamined Patent Application Publication No. 2007-282265 (hereinafter referred to as Patent Document 1) and FIG. 1 of Japanese Unexamined Patent Application Publication No. 2005-252800 (hereinafter referred to as Patent Document 2) are proposed as techniques in which a digital camera is started quickly, an image is captured by a release operation (shutter button pressing operation), and the time to complete the image capturing is shortened.

In Patent Document 1, a method is proposed in which a system start program of a digital camera is divided into a minimum necessary portion for capturing an image and a remaining portion, the minimum necessary portion is read and executed just after the camera is started, and thereafter the remaining portion is read and executed, so that the time from when the camera is started to when the camera becomes able to capture an image is shortened. Specifically, in the technique described in Patent Document 1, if the digital camera is set to a quick start mode, when the system is started, first, a part of the start program, which is a program necessary for activating an image capturing system, is read from a ROM and developed in a buffer memory. Next, activating processing of the image capturing system is performed, and when this processing is completed, an image can be captured. In this image capturing, as for image capturing conditions such as an exposure value, a shutter speed, a focal length, and the like, fixed values are used such as values set when the apparatus is designed, values set by a user in advance, or values used when the last image capturing was performed, and the like. In the quick start mode, if the shutter button is pressed when or after the image capturing system is activated, the first image capturing is performed instantaneously, and the captured image data is stored in the buffer memory as raw data, which is uncompressed full-size image data. When the shutter button is pressed again after the first image capturing is completed, the second image capturing is performed continuously, and the captured image data is stored in the buffer memory as raw data.

In Patent Document 2, a method is proposed in which, in a digital camera including an optical zoom function, the quick start is performed in the same way as the above method when the shutter button is pressed, and thereafter, images are continuously captured in a fixed focus state while scanning the optical zoom, so that the digital camera is instantaneously started and a plurality of images are captured. Specifically, in the technique described in Patent Document 2, if the shutter button is pressed when power is turned off, a program related to basic operation is read from the ROM, the program is developed in a program storage memory in the buffer memory, the camera enters a quick-start rapid-shot mode, and a zoom lens is zoom-driven (to the wide side) and focus-driven (to the pan-focus side). Next, the image capturing system such as CCD is activated, and continuous image capturing is performed until the image memory becomes full while the shutter button is pressed. After the continuous image capturing, the other program related to additional functions is read, information regarding a memory card is obtained, and activation of an LCD monitor or the like is performed, so that a fully functional camera start is achieved. Since, in this technique, when the shutter button is first pressed and an image is captured, the autofocus is not operated, the time corresponding to the autofocus operation can be saved and a quick start is possible.

SUMMARY OF THE INVENTION

In the quick start technique described above, although the time from when the system is started to when an image capturing operation becomes possible or to when an image is captured can be shortened to some extent, it is not guaranteed that an appropriate captured image can be obtained.

Specifically, although to obtain a good quality image by a digital camera, three important conditions have to be satisfied, which are exposure, white balance, and focus, the quick start technique described above may not satisfy especially the conditions of exposure and white balance. As for the condition of focus, for example, by using Patent Document 2, it is expected that to some extent satisfactory image can be obtained. On the other hand, as for the conditions of exposure and white balance, even when using Patent Document 1 or Patent Document 2, it is highly possible that a satisfactory image may not be obtained. In related art, when determining the exposure and the white balance, a feedforward control is performed in which a predetermined initial setting value is set to a starting point, and an optimal values of exposure and white balance are searched on the basis of the captured image obtained from an image sensor. Therefore, convergence time may be necessary to some extent until the optimal values are obtained, and when image capturing is performed just after the start in the same way as in the above quick start technique, in other words, when the image capturing is performed before exposure and white balance converge to optimal values, there is a risk that an image having inappropriate exposure (too bright image or too dark image) or an image having abnormal color may be captured. Off course, these problems occur, for example, in a camera apparatus installed in a mobile phone terminal in the same way as described above.

The present invention is made in view of the above situation, and it is desirable to provide a mobile phone terminal with a camera function and a control method thereof for not only shortening the time from the release operation to when the image capturing is completed, but also obtaining a captured image having an appropriate exposure and color.

The mobile phone terminal with a camera function according to an embodiment of the present invention includes a camera hardware section having an image sensor and a camera lens, an instruction input section for inputting a user instruction to start image capturing, and an illumination sensor which is arranged on an outer surface of a housing near an area where the camera lens is arranged and detects an ambient illumination value while a mobile phone function is activated. In addition, the mobile phone terminal with a camera function according to an embodiment of the present invention includes an image capturing start control section for setting at least camera driver software in the camera hardware section into a standby state while the mobile phone function is activated, when an instruction to start image capturing is inputted from the instruction input section, determining an exposure value, which is used when the camera hardware section performs image capturing, by using the illumination value detected by the illumination sensor, restoring the camera driver software, and performing image capturing using the exposure value.

Specifically, in accordance with the mobile phone terminal with a camera function according to an embodiment of the present invention, the camera driver software is set in a standby state while the mobile phone function is activated. The mobile phone terminal with a camera function according to an embodiment of the present invention can detect ambient illuminance by the illumination sensor arranged near the camera lens. The mobile phone terminal with a camera function according to an embodiment of the present invention immediately restores the camera driver software when an image capturing instruction is inputted by a user. In this way, in accordance with the mobile phone terminal with a camera function according to an embodiment of the present invention, it is possible to capture an image corresponding to an instantaneous shutter chance. In accordance with the mobile phone terminal with a camera function according to an embodiment of the present invention, since the exposure is determined by using the illumination value detected by the illumination sensor when performing image capturing, a captured image having an approximately correct exposure, which is difficult to modify and/or correct after the image capturing, can be obtained.

The mobile phone terminal with a camera function according to an embodiment of the present invention starts camera application software after or in parallel with the execution of image capturing using the detected illumination value. The mobile phone terminal with a camera function according to an embodiment of the present invention performs white balance correction of an image signal of the image captured by using the detected illumination value on the basis of a white balance value determined by the started camera application software.

In summary, in accordance with the mobile phone terminal with a camera function according to an embodiment of the present invention, correct color of the captured image is obtained by performing white balance correction of the image signal having been captured on the basis of the white balance value determined by the camera application software.

In the mobile phone terminal with a camera function according to an embodiment of the present invention, the camera driver software is set in the standby state while the mobile phone function is activated, and the exposure is determined by using the illumination value detected by the illumination sensor and the camera driver software is immediately restored to perform image capturing when the image capturing instruction (release operation) is inputted by the user, so that not only the time from the release operation to when the image capturing is completed is shortened, but also a captured image having an appropriate exposure can be obtained.

In the mobile phone terminal with a camera function according to an embodiment of the present invention, a captured image having appropriate color can be obtained by performing white balance correction of the image signal obtained by the image capturing using the detected illumination value on the basis of the white balance value determined by the camera application software.

BRIEF DESCRIPTION OF THE DRAWINGS

FIG. 2 is a schematic external front view of the mobile phone terminal according to the embodiment of the present invention;

FIG. 3 is a schematic external side view of the mobile phone terminal according to the embodiment of the present invention;

FIG. 4 is a schematic external rear view of the mobile phone terminal according to the embodiment of the present invention;

FIG. 5 is a diagram used for explaining an optimal exposure value search method when setting an exposure in a normal mobile phone terminal with a camera function;

FIG. 10 is a sequence diagram for explaining the flow of the camera start control and the image capturing control in the quick start image capturing mode by using the schematic hierarchical structure of hardware, user interface, and software in the mobile phone terminal according to the embodiment.

DESCRIPTION OF THE PREFERRED EMBODIMENTS

Hereinafter, an embodiment of the present invention will be described with reference to the drawings.

Although, in this embodiment, a mobile phone terminal with a camera function is used as an example to which the present invention is applied, off course the content described here is only an example, and it goes without saying that the present invention is not limited to this example.

[Schematic Configuration of the Mobile Phone Terminal]

Figure 1:
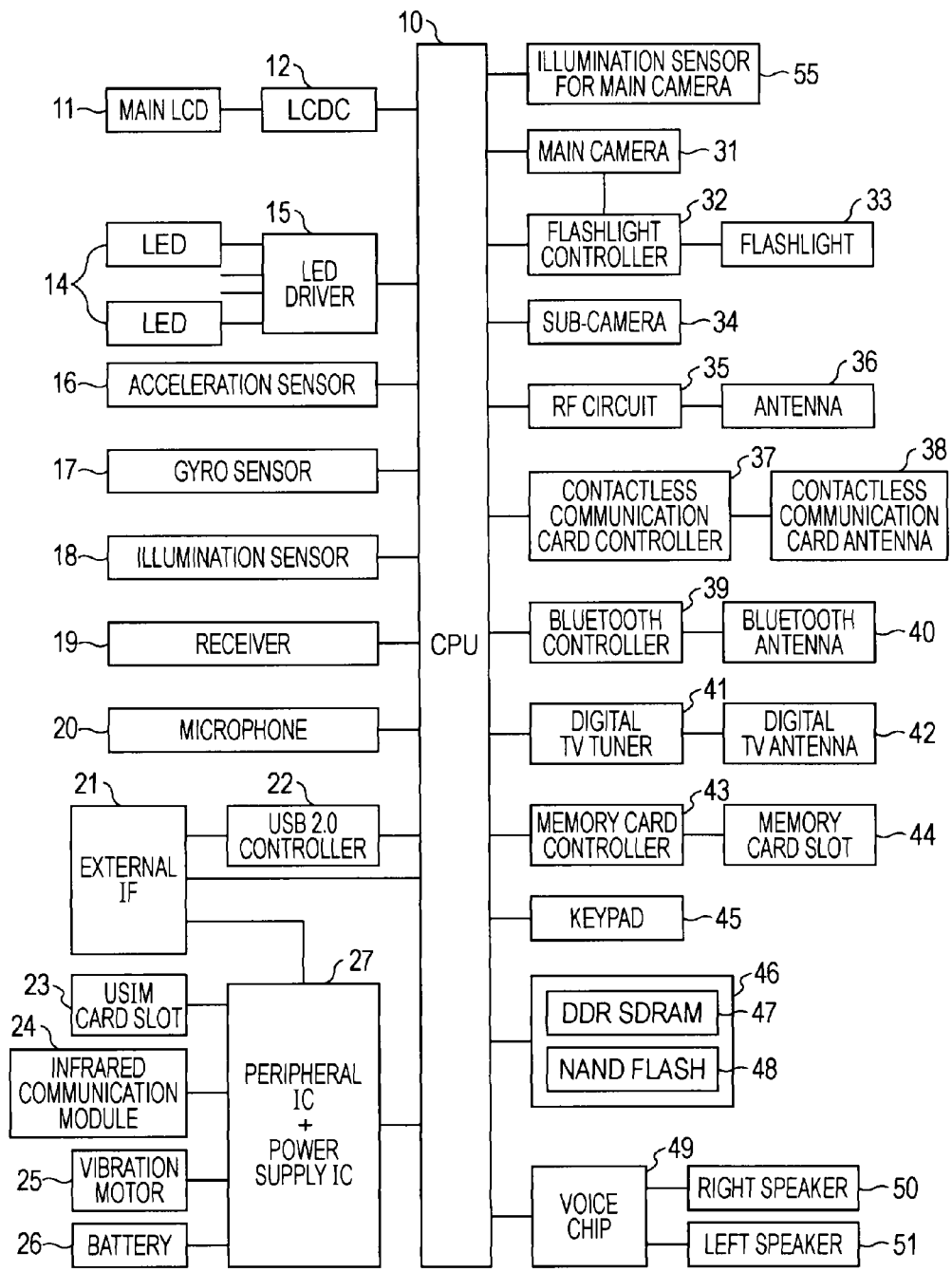
FIG. 1 is a block diagram showing a schematic internal configuration example of a mobile phone terminal according to an embodiment of the present invention.

FIG. 1 shows a schematic configuration of the mobile phone terminal of the embodiment.

In FIG. 1, LCD (Liquid Crystal Display) 11 is a liquid crystal display installed in the mobile phone terminal of the embodiment. LCDC 12 is a liquid crystal display controller for controlling an operation, display, and the like of the LCD 11.

LEDs (light emitting diodes) 14 are various illumination light sources arranged on the mobile phone terminal of the embodiment such as, for example, an incoming call lamp and a illumination lamp of a keypad 45. An LED driver 15 drives and controls the plurality of LEDs 14.

An acceleration sensor 16 detects a magnitude and direction of acceleration of physical vibration when, for example, the physical vibration is applied to the mobile phone terminal of the embodiment. A detection signal of the acceleration sensor 16 is transmitted to CPU 10.

A gyro sensor 17 detects an angular velocity and rotation angle in a rotation direction of physical vibration when, for example, the physical vibration is applied to the mobile phone terminal of the embodiment. A detection signal of the gyro sensor 17 is transmitted to the CPU 10.

An illumination sensor 18 detects ambient brightness around the mobile phone terminal of the embodiment in order to, for example, determine display brightness of the LCD 11. A detection signal of the illumination sensor 18 is transmitted to the CPU 10.

A receiver 19 is a speaker for outputting an incoming voice when voice communication is performed by the mobile phone terminal of the embodiment.

A microphone 20 is a voice input device for inputting an outgoing voice when voice communication is performed by the mobile phone terminal of the embodiment.

An external interface (I/F) 21 is constituted by various external connectors and external connection section which transmits/receives signals to/from the connectors. The external connectors include a connector compatible with so-called USB 2.0 (Universal Serial Bus 2.0) standard, and therefore the mobile phone terminal of the embodiment also includes a USB 2.0 controller 22.

A USIM card slot 23 is an IC card slot into which a so-called USIM (Universal Subscriber Identity Module) card storing subscriber information (user information) or the like is inserted.

An infrared communication module 24 is a communication device for performing information communication by using infrared rays.

A vibration motor 25 is a so-called vibrator for generating vibration in the mobile phone terminal of the embodiment.

A battery 26 is a power supply for supplying electric power used by each section in the mobile phone terminal of the embodiment.

A peripheral IC+power supply IC 27 is connected to the USIM card slot 23, the infrared communication module 24, the vibration motor 25, the battery 26, and the external interface (I/F) 21, and performs control of each section, signal processing, and power supply control of the battery 26.

A main camera 31 is constituted by an image capturing optical system such as a camera lens or the like, an image sensor (image capturing device), and the like. A flash 8 (flashlight) 33 is a light source ramp for emitting auxiliary light for image capturing when the main camera 31 captures an image. A flashlight controller 32 controls the light emitted from the flash 33 in conjunction with the image capturing operation of the main camera 31.

An illumination sensor 55 for the main camera is attached to near an area where the camera lens of the main camera 31 is arranged on the outer surface of the housing of the mobile phone terminal, and detects brightness in the direction to which the camera lens 31 of the main camera 31 faces. Although details will be described below, the illumination sensor 55 for the main camera is provided for detecting brightness (detecting illuminance) of the ambient environment when determining the exposure (shutter speed and gain) of the main camera 31 so that an image having an appropriate exposure and color can be obtained when the shutter button is pressed to get an instantaneous shutter chance as described below. The illumination sensor 55 for the main camera is made of a sensor element whose resistance value varies depending on brightness, especially constituted by a device which may not use a sensor driver and a starter of the device, and hardly consumes electric power. Therefore, the illumination sensor 55 for the main camera can typically detect illuminance of the external environment when a power supply of the main body of the mobile phone terminal of the embodiment is turned on.

A sub-camera 34 is a camera module provided separately from the main camera 31, and is used when, for example, a user takes his or her own photo in a so-called self portrait mode, or the user takes a moving picture of his or her own when communicating via video-phone.

An RF circuit 35 is a wireless communication circuit for the mobile phone terminal of the embodiment to communicate with a base station in a mobile phone network. An antenna 36 is a wireless communication antenna for the mobile phone terminal of the embodiment to communicate with a base station.

A contactless communication card controller 37 performs various controls and signal processing for executing signal communication with a contactless communication IC card by a so-called electromagnetic induction method. A contactless communication card antenna 38 is an antenna for contactless communication using the electromagnetic induction method.

A Bluetooth (registered trademark) controller 39 performs various controls and signal processing for executing wireless communication using a so-called Bluetooth method. A Bluetooth antenna 40 is an antenna for the wireless communication using the Bluetooth method.

A digital TV tuner 41 is a tuner for so-called digital television broadcasting. A digital TV antenna 42 is an antenna for receiving a radio wave of the digital television broadcasting.

A memory card slot 44 is a slot where an external memory card such as, for example, a so-called SD (Secure Digital) card or the like is inserted/removed. A memory card controller 43 performs signal processing and a control for writing/reading data to/from the memory card inserted in the memory card slot 44, or the like.

A keypad 45 includes various keys and buttons such as a numeric keypad, a cross key, a shutter button, and the like mounted on the mobile phone terminal of the embodiment, and generates a keypad output signal when each key or button is operated by a user. In the embodiment, as a button included in the keypad 45, a dedicated shutter button is prepared.

An internal memory 46 includes, for example, a DDR SDRAM (Double Data Rate SDRAM) 47 and a NAND-type flash memory 48. The NAND-type flash memory 48 stores a program of OS (Operating System), a control program for the CPU 10 to control each section, various application programs including quick start image capturing application/middleware according to an embodiment of the present invention described below and camera application software, encoded and compressed contents of music data, moving picture data, and static picture data, various setting values, font data, data of dictionaries, a model name information, a terminal identification information, and the like. The DDR SDRAM 47 stores data at any time as a working area when the CPU 10 performs various data processing and calculations.

A voice chip 49 is an IC circuit for performing signal processing for reproducing music for example. A right speaker 50 and a left speaker 51 for outputting stereo sound are connected to the voice chip 49 via an amp not shown in FIG. 1.

The CPU (central processing unit) 10 performs a communication control, voice processing and its control, image processing and its control, a control of camera's image capturing, other various signal processing, control of each section, and the like. Also, the CPU 10 executes various control programs and application programs accumulated in the internal memory 46, and performs various data processing associated with execution of the programs. Especially, in the embodiment, although details will be described below, when the shutter button is pressed in order to get an instantaneous shutter chance, the CPU 10 performs, for example, processing and control for capturing an image in accordance with the instantaneous pressing of the shutter button and obtaining an appropriate exposure when the image is captured, by using the quick start image capturing application/middleware according to an embodiment of the present invention. Also, the CPU 10 performs processing for correcting color of the image captured by the instantaneous pressing of the shutter button to appropriate color by cooperation of the quick start image capturing application/middleware and the camera application program.

Although not shown in FIG. 1, the mobile phone terminal of the embodiment naturally includes constituent elements included in a normal mobile phone terminal.

[Schematic External Configuration of the Mobile Phone Terminal]

FIGS. 2 to 4 show a schematic external appearance example of the mobile phone terminal of the embodiment.

FIGS. 2, 3, and 4 respectively show a schematic front view, a schematic side view, and a schematic rear view of the mobile phone terminal of the embodiment.

The mobile phone terminal 1 of the embodiment shown in FIGS. 2 to 4 is a so-called slide type terminal in which an upper housing 2 and a lower housing 3 can relatively slide on each other in a linear direction parallel to each other's main surface. FIGS. 2 to 4 show states in which the mobile phone terminal 1 of the embodiment is slid and opened (open state). In FIGS. 2 to 4, only main constituent elements will be described.

As shown in FIG. 2, LCD 11 is provided on the upper housing 2 of the mobile phone terminal 1 of the embodiment, and a lens of the sub-camera 34 is arranged on the surface of the housing on which the LCD 11 is provided. A numeric keypad and the like of the keypad 45 are provided on the lower housing 3. As shown in FIG. 3, a dedicated shutter button 4 and the memory card slot 44 are arranged on the side surface of the lower housing 3 of the mobile phone terminal 1 of the embodiment. Further, as shown in FIG. 4, a camera lens of the main camera 31 is arranged on the rear surface of the lower housing 3. The illumination sensor 55 for the main camera is arranged near the camera lens of the main camera 31 in the mobile phone terminal 1 of the embodiment.

[Description of Image Capturing Processing in a Normal Mobile Phone Terminal with a Camera Function]

Here, in order to make more clear the features of the quick start image capturing of the mobile phone terminal with a camera function of the embodiment, first, an operation when a normal mobile phone terminal with a camera function captures an image will be described.

A mobile phone terminal with a camera function is different from a normal digital camera apparatus, and it is typically used while maintaining a power-on state, so that the system itself is typically in an operational state. In other words, even when an operation such as a telephone call or the like is not performed, the mobile phone terminal is at least in standby mode waiting for a call, so that the system is typically operating. The mobile phone terminal is typically maintaining a power-on state as described above, and is an electronic device having a feature of typically being carried and used by a user in a state, such as, for example, being put into a pocket or a bag from which the user can easily take out the mobile phone terminal, or being directly held by hand.

Therefore, if an instantaneous shutter chance can be caught by the camera function of the mobile phone terminal in the same way as by a so-called film-with-lens camera, a new form of image capturing is created in combination with the feature of the full-time portability of the mobile phone, so that it is expected to provide a great advantage to users.

However, in a normal mobile phone terminal, a power supply to the camera function is shut down to save the battery power when in normal use, such as in standby mode. Therefore, the mobile phone terminal is configured to turn on the camera function and start the camera application software only when, for example, an instruction for switching to image capturing mode is inputted from a user by a menu operation, a dedicated button operation, or the like. The mobile phone terminal, in which the camera application software is started, performs various initialization settings, such as reset processing of the camera function, setting of user interface for capturing an image, securing of a memory area for temporarily storing image, checking of the capacity of recording medium on which image is recorded, setting of the display for displaying a preview image, and so on.

Even when these initialization settings are completed, setting values of the exposure of the camera function (shutter speed and gain) and the white balance are not suited for the actual environment, so that it is difficult to capture an image immediately. In other words, for example, if an image is captured using a fixed exposure value (an exposure value not suited for the actual environment) which is determined in advance, there will be a problem that only a too bright image is captured in a bright environment, and only a too dark image is captured in a dark environment. Much the same is true on the white balance, and if an image is captured using a fixed white balance setting value (a white balance setting value not suited for the actual environment) which is determined in advance, there will be a problem that only an image having inappropriate color is captured.

Therefore, the mobile phone terminal, which has performed the above initialization settings, performs various adaptation processing for the image capturing environment, such as optimal point search for the exposure and the white balance, and an autofocus scan. Specifically, as shown in FIG. 5, the optimal point search for the exposure is performed by a feedforward method in which, first, an image is obtained by using fixed initial values of gain and shutter speed, the brightness is evaluated on the basis of the obtained image, whether the evaluated value is greater than or smaller than a predetermined target value is determined, and the exposure value for the next image capturing is changed depending on the determination result. The optimal point search for the white balance is performed by a feedforward method in approximately the same way as in the above optimal point search for the exposure.

In a normal mobile phone terminal, after a series of processing including turning on the camera function, starting the camera application software as described above, the initialization setting processing, and the optimal point search processing is entirely completed, an release operation can be accepted, and thereafter, image capturing is performed when the release button is actually pressed.

As described above, a normal mobile phone terminal still has a problem that the starting time from turning on the camera function to when an image can be actually captured is long, and an instantaneous shutter chance is difficult to be caught, in the same way as digital cameras in the related art.

Hereinafter, a process flow from the start of the camera function, through the initialization setting and the optimization setting, to subsequent image capturing in the image capturing operation of the above described normal mobile phone terminal will be described using a hierarchical structure of the hardware, user interface, and software of the mobile phone terminal shown in FIGS. 6 and 7 and a sequence diagram shown in FIG. 8.

Figure 6:
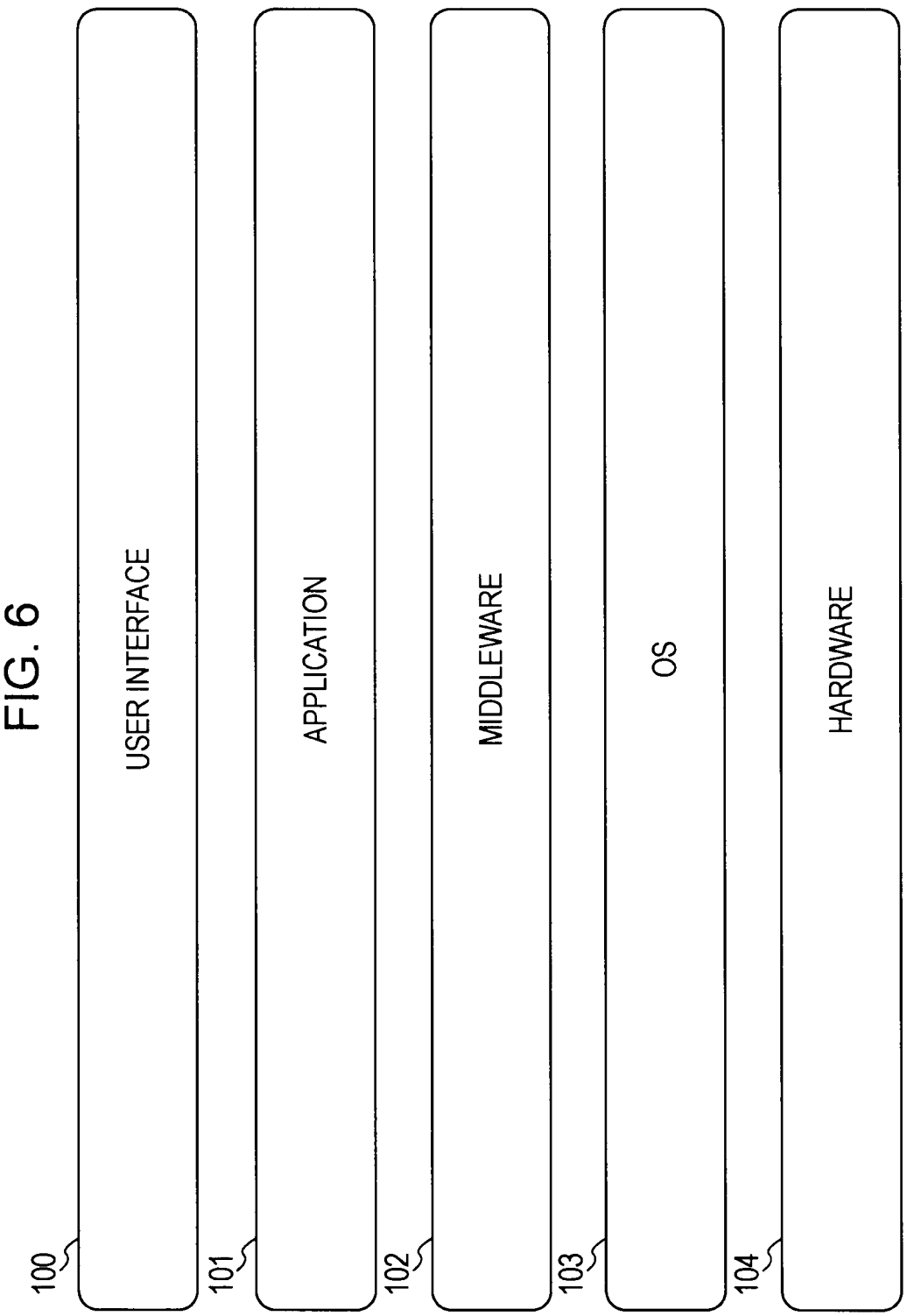
FIG. 6 is a diagram showing a schematic hierarchical structure of hardware, user interface, and software in the normal mobile phone terminal with a camera function.
Figure 7:
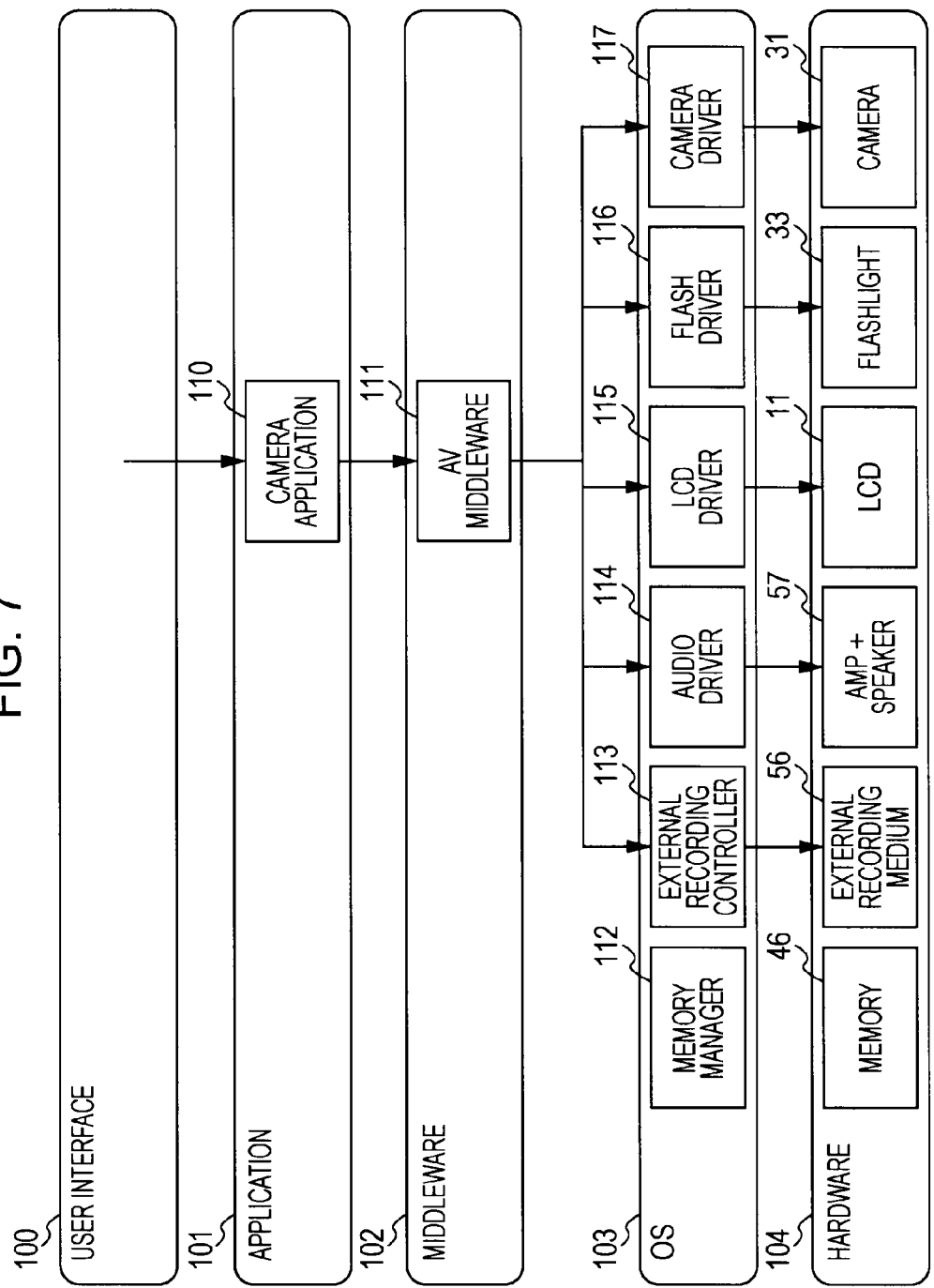
FIG. 7 is a diagram used for explaining a flow of a camera start control when the camera function is used by using the schematic hierarchical structure of hardware, user interface, and software in the normal mobile phone terminal with a camera function.

As shown in FIGS. 6 and 7, in a normal mobile phone terminal, an OS layer 103 is on a hardware layer 104, a middleware layer 102 and an application layer 101 are arranged on the OS layer 103, and the highest layer is a user interface layer 100. Various processings in the OS layer 103, the middleware layer 102, and an application layer 101 are processings actually performed by the CPU using software programs.

Here, when an image is captured by the camera function of a normal mobile phone terminal, basically, as shown in FIG. 7, process proceeds from an upper layer to a lower layer. Specifically, when the camera's image capturing mode is selected through the menu operation or the dedicated button operation in the user interface layer 100, first, the user instruction information corresponding to the above operation is sent to the application layer 101 as shown in step S101 in FIG. 8.

When receiving the user instruction information of the camera's image capturing mode, the camera application software 110 starts in the application layer 101. Then, the started camera application software 110 starts the AV middleware 111 in the middleware layer 102, and starts various initialization setting processing for the camera's image capturing through the AV middleware 111 as shown in step S102.

Specifically, first, the camera application software 110 starts the LCD driver 115 in the OS layer through the AV middleware 111 by step S103, and further turns on the LCD 11 in the hardware layer 104 and performs various settings for the display of the LCD 11 through the started LCD driver 115 as shown in step S104.

When receiving a completion response of the display settings from the LCD driver 115 in step S105, the camera application software 110 starts the camera driver 117 in the OS layer 103 through the AV middleware 111 as shown in step S106, and further as shown in step S107, turns on the main camera 31 in the hardware layer 104 and performs cancellation of the reset through the started Camera driver 117.

When receiving a completion response of the turning on and the reset cancellation of the main camera 31 from the camera driver 117 in step S108, the camera application software 111 requests the main camera 31 to perform the various initialization settings as described above through the AV middleware 111 and the camera driver 117 as shown in step S109.

When the various initialization settings of the main camera 31 are performed in step S110 and a completion response of the initialization settings is received through the camera driver 117 and the AV middleware 111 by step S111, the camera application software 110 requests the main camera 31 to perform the optimization settings of the exposure and the white balance as described above through the AV middleware 111 and the Camera driver 117 as shown in step S112. By doing so, in the camera driver 117 and the main camera 31, the optimization settings of the exposure and the white balance are performed in step S113. When the optimization settings of the exposure and the white balance of the main camera 31 are completed in the step S113 and a completion response of the optimization settings of the exposure and the white balance is received through the camera driver 117 and the AV middleware 111 in step S114, the camera application software 110 enables the release operation of the shutter button 4 in the user interface layer 100 to be accepted by step S115.

Figure 8:
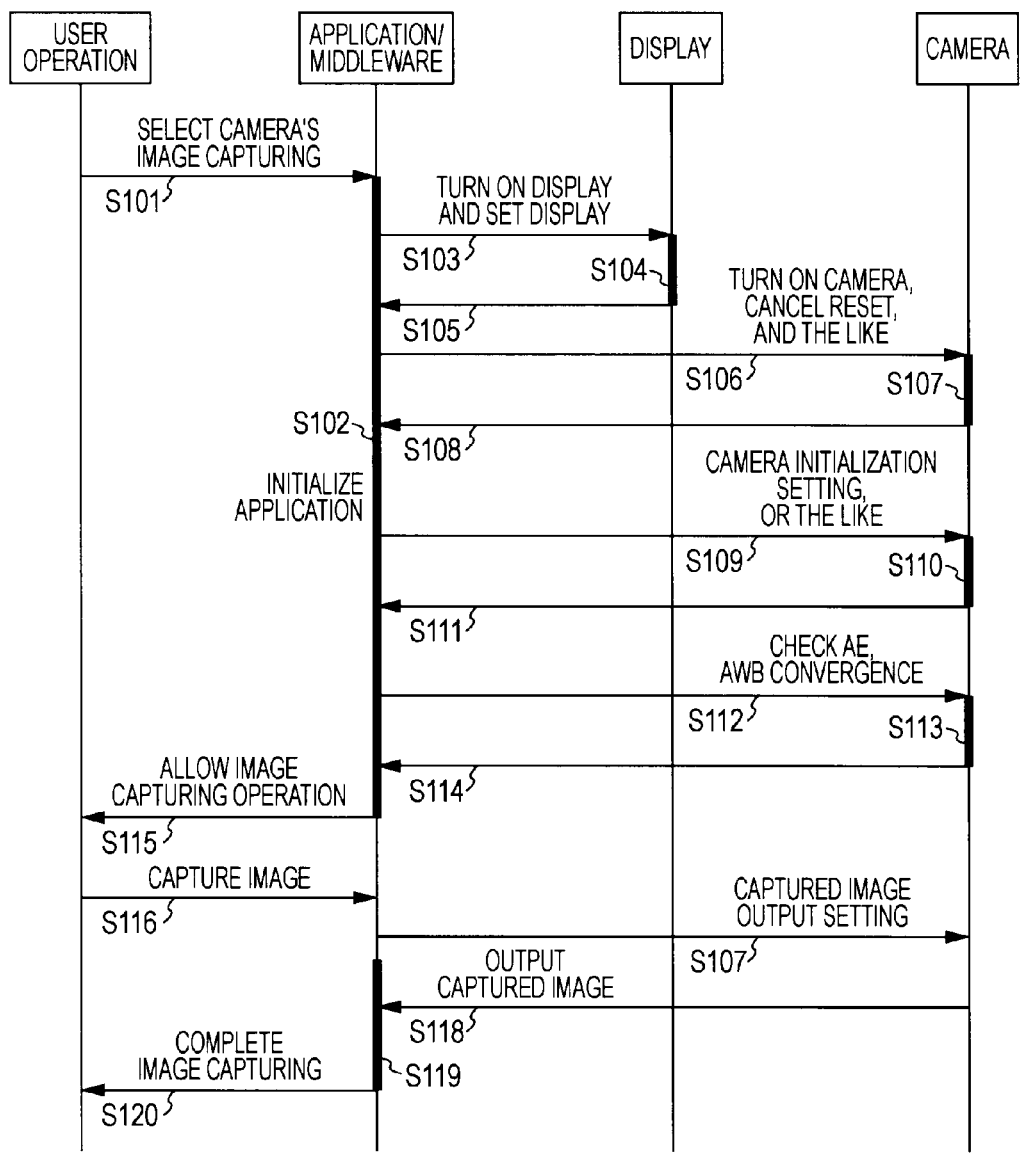
FIG. 8 is a sequence diagram used for explaining a flow of the camera start control when the camera function is used in the normal mobile phone terminal with a camera function.

Although not shown in FIG. 8, the camera application software 110 also starts the flash driver 116, the audio driver 114, the external storage controller 113 (memory card controller 43), and the memory manager 112 in the OS layer through the AV middleware 111 simultaneously in parallel with the LCD driver 115 and the camera driver 117 described above. The camera application software 110 also performs the start and the various settings of the flashlight 33, the amp and speaker 57 (the voice chip 49 and the left/right speakers 50, 51), the external recording medium 55 such as a memory card or the like inserted in the memory card slot 44, and the like in the hardware layer 104 through the drivers and controllers described above.

Thereafter, when the release operation is performed through the shutter button 4, the release signal corresponding to the release operation is transmitted to the camera application software 110 from the user interface layer 100 as shown in step S110. The camera application software 110, which receives the release signal, causes the main camera 31 to perform image capturing through the AV middleware 111 and the camera driver 117 in step S117. Then, the main camera 31, which performs the image capturing, returns the captured image data to the camera application software 110 in step S119. The camera application software 110, which receives the captured image data, performs a predetermined processing such as compression or the like on the captured image data as necessary, records the data in a memory in step S119, and thereafter notices the user that the image capturing is completed by, for example, a display notice though the user interface layer 100 by step S120.

[Description of the Quick Start and Image Capturing of the Camera Function in the Mobile Phone Terminal of the Embodiment]

In view of the image capturing operation in a normal mobile phone terminal with a camera function as described above, for example, when an instantaneous release operation is performed during normal use such as during standby mode, the mobile phone terminal with a camera function of the embodiment enables that the image capturing of the main camera 31 is performed responding quickly to the release operation and a captured image having an appropriate exposure and correct color is obtained and stored by performing operations and controls described below.

In the mobile phone terminal of the embodiment, an operation mode in which a captured image having an appropriate exposure and correct color can be obtained and stored responding quickly to an instantaneous release operation is called "quick start image capturing mode" in the description below.

When the quick start image capturing mode starts, the mobile phone terminal of the embodiment performs initialization of various settings at least necessary for camera's image capturing, and puts only the camera driver and the main camera 31 in the various drivers and hardware necessary only for camera's image capturing into a low power consumption mode after the initialization settings necessary for the camera's image capturing are completed, while the camera driver and the main camera 31 are set to be able to restart instantaneously. On the other hand, as for the other drivers and hardware other than the camera driver and the main camera 31 in the various drivers and hardware necessary only for the camera's image capturing, the power supply is shut down and the operations are stopped. In the embodiment, the low power consumption mode in the quick start image capturing mode is called "quick start image capturing standby mode".

When in the quick start image capturing standby mode as described above, for example, if the shutter button is pressed by the user, the mobile phone terminal of the embodiment instantaneously cancels the standby state of the camera driver and the main camera 31, and switches the state to a state in which image capturing is possible.

At this time, the mobile phone terminal also performs exposure setting of the camera at the same time on the basis of the illumination information typically obtained from the main camera's illumination sensor 55 arranged near the main camera 31. Since the exposure setting corresponding to the illumination information at this time should be performed instantaneously, it is desired to use, for example, a feedback method in which an exposure value corresponding to the illumination information is selected from a correspondence table between illuminance and exposure prepared in advance, but not to use a setting method which uses a feed forward control and some calculations in which exposure is converged to an optimal exposure. In this way, the time for waiting for the exposure setting to converge to an optimal point described above is not necessary.

The mobile phone terminal of the embodiment stores the image data captured by the main camera 31 using the above exposure setting into a memory as an image data captured by pressing the shutter button.

In other words, in the embodiment, when an image is captured by pressing the shutter button in the quick start image capturing standby mode, for example, a graphical user interface or a preview screen displayed when normal camera application software starts is not displayed, and image capturing by the main camera 31 is performed while only an exposure (shutter speed and gain) based on the illumination information from the illumination sensor 55 for the main camera is set. In the mobile phone terminal of the embodiment, a series of processing such as initialization setting or the like of the other functions (above described preview screen display, and the like) not directly related to a reading operation of the camera's captured image (operation for reading the image data outputted from the main camera 31), and the start of the camera application software are performed after the above reading operation of the camera's captured image is completed. In this way, according to the embodiment, when an instantaneous release operation is performed in standby mode or the like, quick image capturing responding quickly to the release operation and storing of the image can be performed.

When the image capturing is performed while only the exposure is set as in the embodiment, the white balance is not necessarily appropriate. Therefore, after the image is captured and stored by the quick image capturing, when the camera application starts and an optimal point of the white balance is obtained by the camera application, the mobile phone terminal of the embodiment performs a collection operation on the image having been stored by using the optimal point to obtain an image having an appropriate white balance. In other words, when image capturing is performed, although the white balance can be corrected by the correction operation performed on the captured image, it is difficult to correct the exposure setting by a correction operation of the captured image. Therefore, in the embodiment, image capturing is performed using only the exposure setting, and thereafter the correction operation of the white balance is performed to obtain a good quality captured image. Since the processing for correcting the white balance of the captured image is processing performed on the image captured in the quick start image capturing mode, the processing is performed by software for the quick start image capturing mode in the embodiment. Off course, the processing for correcting the white balance of the captured image may be performed by the camera application software.

Hereinafter, a process flow of the instantaneous image capturing and storing in the above described mobile phone terminal with a camera function of the embodiment, and subsequent image capturing processing after starting the camera application will be described using a hierarchical structure of the hardware, user interface, and software of the mobile phone terminal shown in FIG. 9 and a sequence diagram shown in FIG. 10.

Figure 9:
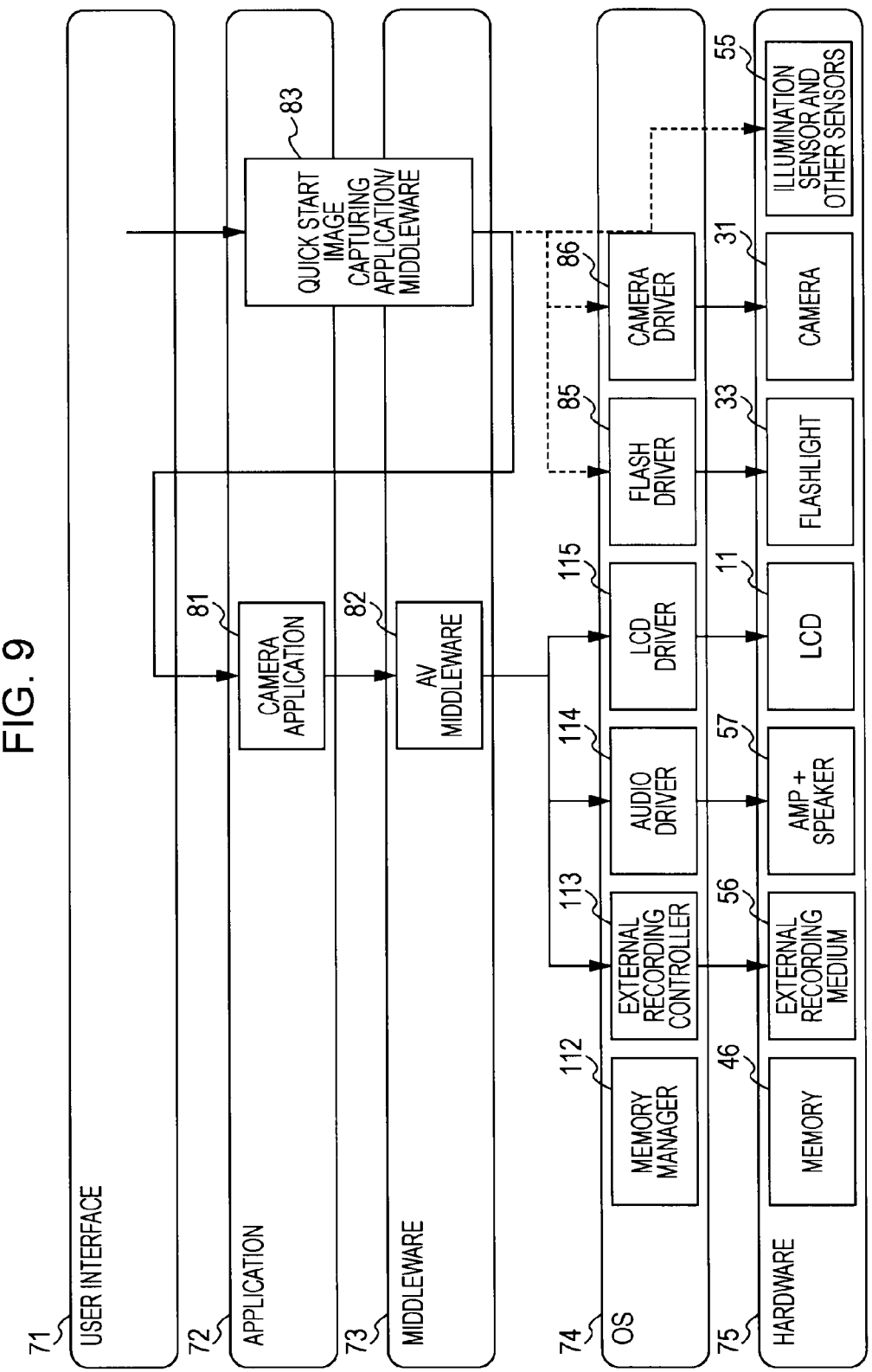
FIG. 9 is a diagram used for explaining a flow of a camera start control and an image capturing control in a quick start image capturing mode by using a schematic hierarchical structure of hardware, user interface, and software in the mobile phone terminal according to the embodiment.

As shown in FIG. 9, in the mobile phone terminal of the embodiment, an OS layer 74 is on a hardware layer 75, a middleware layer 73 and an application layer 72 are arranged on the OS layer 74, and the highest layer is a user interface layer 71. Various processings in the OS layer 74, the middleware layer 73, and an application layer 72 are processings actually performed by the CPU 10 using software programs.

When the embodiment is in the quick start image capturing mode, the quick start image capturing application/middleware 83 is prepared between the application layer 72 and the middleware layer 73. Although the quick start image capturing application/middleware 83 may be an internal function of the camera application software 81, in this case, the camera application software 81 includes the function of the quick start image capturing standby mode. In the description below, an example is used in which the quick start image capturing application/middleware 83 is provided independently.

In the mobile phone terminal of the embodiment, when the power button in the user interface layer 100 is pressed and the main body is turned on as shown in step S1, first, basic functions as the mobile phone are started (for example, communication function is turned on, display is turned on, display setting is performed, and so on) as shown in steps S3 and S4. When these basic functions start, the quick start image capturing application/middleware 83 starts as shown in step S5.

The quick start image capturing application/middleware 83 at this time starts the camera driver 86 in the OS layer 74 as shown in step S6, and further as shown in step S7, causes the camera driver 86 to turn on the main camera 31 in the hardware layer 75 and cancel reset of the main camera 31.

When receiving a completion response of the turning on and the reset cancellation of the main camera 31 from the camera driver 86 in step S8, the quick start image capturing application/middleware 83 requests the main camera 31 to perform the various initialization settings in the same way as described above through the camera driver 86 as shown in step S9.

When the various initialization settings of the main camera 31 are performed in step S10, and a completion response of the initialization settings is received through the camera driver 86 in step S11, the quick start image capturing application/middleware 83 issues a request to set the camera driver 86 and the main camera 31 in the standby state as shown in step S12. In this way, the mobile phone terminal of the embodiment is in the quick start image capturing standby mode.

The quick start image capturing application/middleware 83 at this time notices the user that the mobile phone terminal is in the quick start image capturing standby mode by using, for example, a display notice through the user interface layer 71.

Here, it is assumed that the shutter button 4 is pressed by the user when in the quick start image capturing standby mode, in other words, a release operation in a state in which the user does not issue an instruction for normally starting the camera application software is performed, or a release operation in which the user desires an instantaneous image capturing is performed. When the shutter button 4 is pressed in the quick start image capturing standby mode, a quick start image capturing request is transmitted from the user interface layer 71 to the quick start image capturing application/middleware 83 as shown in step S21.

When receiving the quick start image capturing request, the quick start image capturing application/middleware 83 performs restoration setting of the camera function by cancelling the standby mode on the camera driver 86 and the main camera 31, and further performs appropriate exposure setting on the basis of the illumination information obtained from the illumination sensor 55 for the main camera as shown in step S23. At the same time, an image capturing operation corresponding to the above release operation is performed in the camera driver 86 and the main camera 31. At this time, the flashlight 33 may emit light depending on the appropriate exposure setting value. Then, the camera driver 86 and the main camera 31 transmit the captured image data obtained by the image capturing to the quick start image capturing application/middleware 83 in step S25.

The quick start image capturing application/middleware 83 which receives the captured image data stores the image data in a memory or the like.

Also in the embodiment, when the quick start image capturing request is transmitted in the step S21, the quick start image capturing application/middleware 83 starts the camera application software 81 in the application layer 72 as step S22 in parallel with performing the processing of the steps S23 to S25.

The camera application software 81 started in the step S22 starts the AV middleware 82 in the middleware layer 73, and further performs optimization settings of the exposure and the white balance through the started AV middleware 82 and the camera driver 86 as shown in step S26. When the optimization settings of the exposure and the white balance of the main camera 31 are completed in the step S27 and a completion response of the optimization settings of the exposure and the white balance is received through the camera driver 86 and the AV middleware 82 in step S28, the quick start image capturing application/middleware 83 performs white balance correction on the image captured in the step S25 by using the optimized white balance value as necessary to correct the color of the image.

Thereafter, the camera application software 81 notices the user that the image capturing is completed by using, for example, a display notice through the user interface layer 71.

Thereafter, if the release operation is further performed, image capturing controlled by the camera application software 81 is performed.

Although not shown in FIG. 10, the camera application software 81 which is started in the step S22 starts the flash driver 85, the audio driver 114, the external storage controller 113 (memory card controller 43), the LCD driver 115, and the like in the OS layer through the AV middleware simultaneously in parallel. The camera application software 81 also performs the start and the various settings of the flashlight 33, the amp and speaker 57 (the voice chip 49 and the left/right speakers 50, 51), the external recording medium 55 such as a memory card or the like inserted in the memory card slot 44, and the like in the hardware layer 74 through the drivers and controllers described above.

[Other Embodiments]

According to the above described embodiment, although an example is used in which the quick start image capturing mode is started at the same time as when a terminal is turned on such as when the main body of the mobile phone terminal of the embodiment is turned on, for example, the quick start image capturing mode may be started in accordance with an instruction for starting the quick start image capturing mode from the user. Because, for example, although the camera driver 85 and the main camera 31 is set in power save standby mode during the quick start image capturing standby mode of the quick start image capturing mode, and standby power is not much increased, the standby power is surely increased compared with when the power supply to them is completely shut down. When the standby power is consumed by the camera driver 85 and the main camera 31 as described above, for example, there is, in any way, a demerit that the standby time or the like decreases. Therefore, for users who do not want such a decrease of standby time, for example, it is desired that the quick start image capturing mode can be arbitrarily set to be enabled or disabled by a user from a menu setting screen or the like of the terminal.

In the above described embodiment, when the shutter button 4 is pressed during the quick start image capturing mode, the image capturing is performed immediately. Therefore, there is a risk that image capturing is performed even by an operation mistake such as when pressing the shutter button 4 while the mobile phone terminal is in a pocket or bag. Off course, if the image capturing by the operation mistake is performed, power consumption is wasted by starting the camera. Therefore, for example, when the illumination information detected by the illumination sensor 55 for the main camera is smaller than a predetermined value which indicates that the mobile phone terminal is in a very dark environment, and if a signal indicating that the shutter button 4 is pressed is received, the mobile phone terminal of the embodiment determines that the signal is generated by an operation mistake, ignores the signal, and maintains the quick start image capturing standby mode. In this way, even if the shutter button 4 is mistakenly pressed while the mobile phone terminal is in a pocket or bag, the camera is not started, so that power consumption is not wasted and unnecessary image capturing is not performed. It is desirable that a function for preventing the operation mistake can be set to be enabled or disabled by a user. In other words, when a user desires that instantaneous image capturing in a dark environment, such as in the night can be performed, the function for preventing the operation mistake should be able be set to be disabled in advance so that the image capturing can be performed.

[Summary]

As described above, the mobile phone terminal with a camera function of the embodiment has features and advantages as described below.

According to the mobile phone terminal of the embodiment, in the quick start image capturing mode, quick start image capturing is performed at the same time as calling the camera function by pressing a dedicated button provided physically, such as the shutter button 4.

According to the mobile phone terminal of the embodiment, since, in image capturing during the quick start image capturing mode, various setting processing of initialization and the like, which are performed before image capturing, such as preview image display, searching of optimal points of exposure and white balance, and autofocus scan which are performed in normal image capturing can be skipped, an image can be captured without missing an instantaneous shutter chance.

According to the mobile phone terminal of the embodiment, in image capturing during the quick start image capturing mode, by performing exposure (shutter speed and gain) setting using the illumination information from the dedicated illumination sensor (illumination sensor for the main camera) provided on the surface on which the camera is mounted, an image having an appropriate exposure condition can be captured without consuming time used for the optimal point search processing performed in normal image capturing.

According to the mobile phone terminal of the embodiment, in image capturing during the quick start image capturing mode, an image having a correct color can be obtained, by correcting an image captured using an appropriate exposure value and a fixed or provisional white balance setting value on the basis of an optimal white balance value obtained by converging the white balance value to an optimal point after the image is captured.

According to the mobile phone terminal of the embodiment, in the quick start image capturing mode, when the shutter button is pressed in a very dark environment, the pressing of the button is determined to be caused by an operation mistake, and it is possible to eliminate image capturing caused by the operation mistake and useless power consumption by ignoring a signal indicating that the shutter button is pressed.

According to the mobile phone terminal of the embodiment, since the enabled/disabled of the quick start image capturing mode, the enabled/disabled of the function for preventing operation mistake, and the like can be arbitrarily set by a user, various requests of users can be satisfied.

The above description of the embodiments is an example of the present invention. Therefore, the present invention is not limited to the embodiments described above, and off course, various modifications are possible depending on a design or the like without departing from the scope of the technical idea of the present invention. For example, in the embodiments described above, although a mobile phone terminal is used as an example, the present invention can be applied to any electronic device which is typically activated and includes a camera function in the same way as the mobile phone terminal.

The present application contains subject matter related to that disclosed in Japanese Priority Patent Application JP 2008-321608 filed in the Japan Patent Office on Dec. 17, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile phone terminal with a camera function, comprising:
    a camera hardware section including an image sensor and a camera lens for capturing an image;
    an instruction input section configured to input a user instruction to start image capturing;
    an illumination sensor which is arranged on an outer surface of a housing near an area where the camera lens is arranged and detects an ambient illumination value while a mobile phone function is activated; and
    an image capturing start control section configured to start at least camera driver software in the camera hardware section and to thereafter set, in response to a user input, the at least camera driver software in the camera hardware section into a standby state in which power is consumed by the camera driver software while the mobile phone function is activated and at least one other driver or hardware used for the camera function but not necessary for image capturing to a state in which no power is consumed,
    wherein when an instruction to start image capturing is inputted from the instruction input section, the image capturing start control section is configured to determine an exposure value, which is used when the camera hardware section performs image capturing, by using the illumination value detected by the illumination sensor, restore the camera driver software, cause the camera hardware section to perform image capturing using the exposure value, and correct white balance of an image signal obtained by the image capturing after the image is captured, and
    wherein the exposure value is determined from a correspondence table between illuminance and exposure prepared in advance based on the illumination value detected by the illumination sensor such that the exposure value is determined from the correspondence table after the camera driver software exits the standby state and before any images are initially captured.

2. The mobile phone terminal with a camera function according to claim 1, wherein the image capturing start control section is software higher than the camera driver software, and starts camera application software which performs, at least, processing for determining image capturing setting values including an exposure value and a white balance value by using an image capturing signal from the image sensor, and processing for causing the camera hardware section to perform image capturing using the determined image capturing setting values through the camera driver software, after or in parallel with performing image capturing using the detected illumination value.

3. The mobile phone terminal with a camera function according to claim 2, wherein the image capturing start control section corrects the white balance of an image signal obtained by the image capturing using the detected illumination value on the basis of the white balance value determined by the started camera application software.

4. The mobile phone terminal with a camera function according to claim 1, wherein the image capturing start control section maintains the standby state of the camera driver software if the illumination value detected by the illumination sensor is smaller than a predetermined value when the instruction to start image capturing is inputted from the instruction input section.

5. A method for controlling a mobile phone terminal with a camera function, comprising the steps of:
    starting camera driver software in a camera hardware block including an image sensor and a camera lens which capture an image, and thereafter setting, in response to a user input, the camera driver software into a standby state in which power is consumed by using an image capturing start control section while a mobile phone function is activated and setting at least one other driver or hardware used for the camera function but not necessary for image capturing to a state in which no power is consumed;

detecting an ambient illumination value by using an illumination sensor which is arranged on an outer surface of a housing near an area where the camera lens is arranged while the mobile phone function is activated;

determining an exposure value, which is used when the camera hardware section performs image capturing, by using the illumination value detected by the illumination sensor, restoring the camera driver software, and causing the camera hardware section to perform image capturing using the exposure value, by using the an image capturing start control section when a user instruction to start image capturing is inputted from an instruction input section; and correcting white balance of an image signal obtained by the image capturing after the image is captured, wherein the exposure value is determined from a correspondence table between illuminance and exposure prepared in advance based on the illumination value detected by the illumination sensor such that the exposure value is determined from the correspondence table after the camera driver software exits the standby state and before any images are initially captured.

6. The mobile phone terminal with a camera function according to claim 1, further comprising a display section configured to display a preview screen of an image to be captured by the camera hardware section when the camera function is in a normal mode, wherein when the camera driver software in the camera hardware section is set into the standby state and the instruction to start image capturing is inputted from the instruction input section, the display section does not display the preview screen.

* * * * *